(No Model.) 3 Sheets—Sheet 1.
D. H. RADER & J. MALSBARY.
GRAIN THRASHER AND CLEANER.
No. 273,391. Patented Mar. 6, 1883.
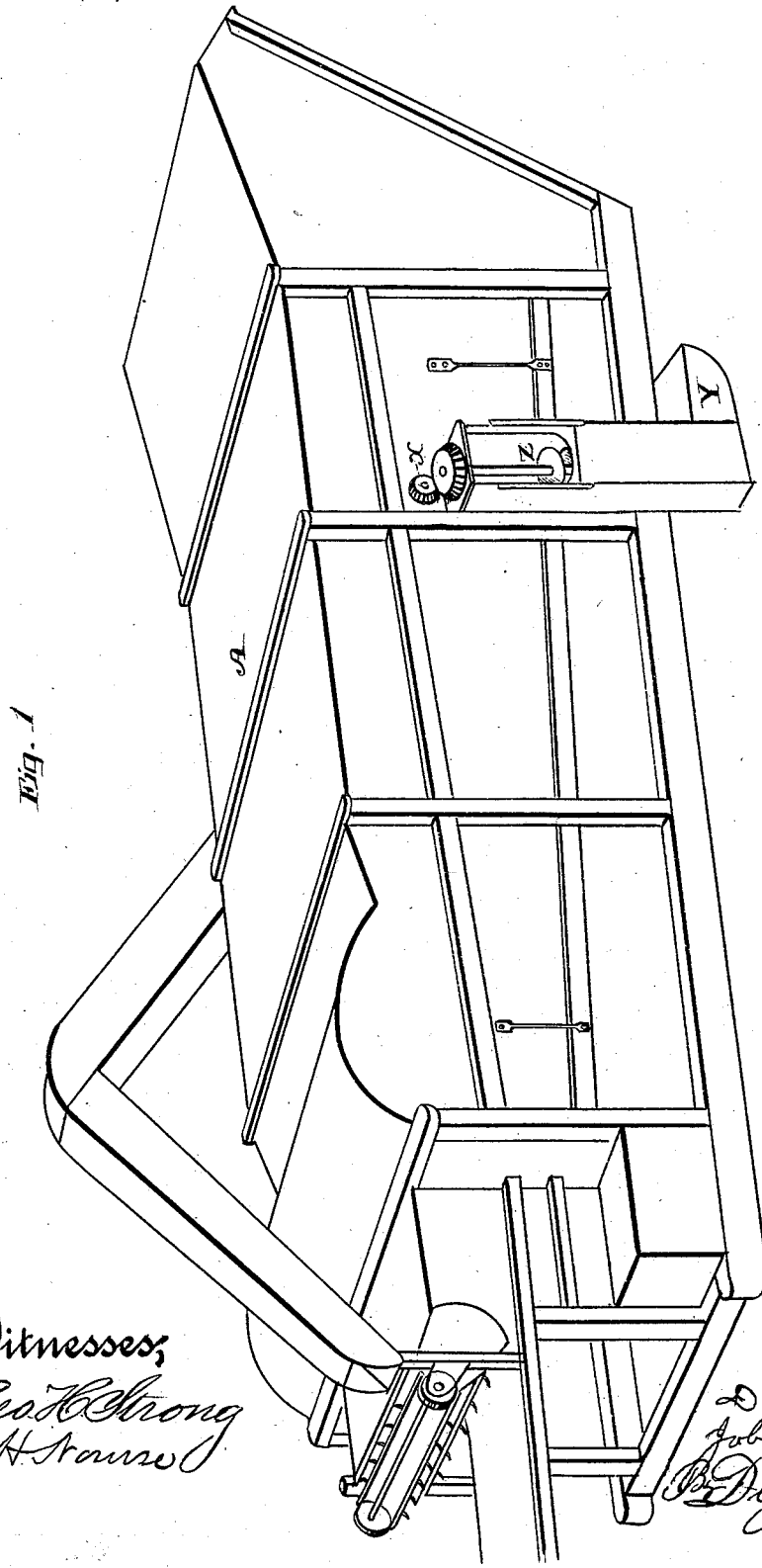

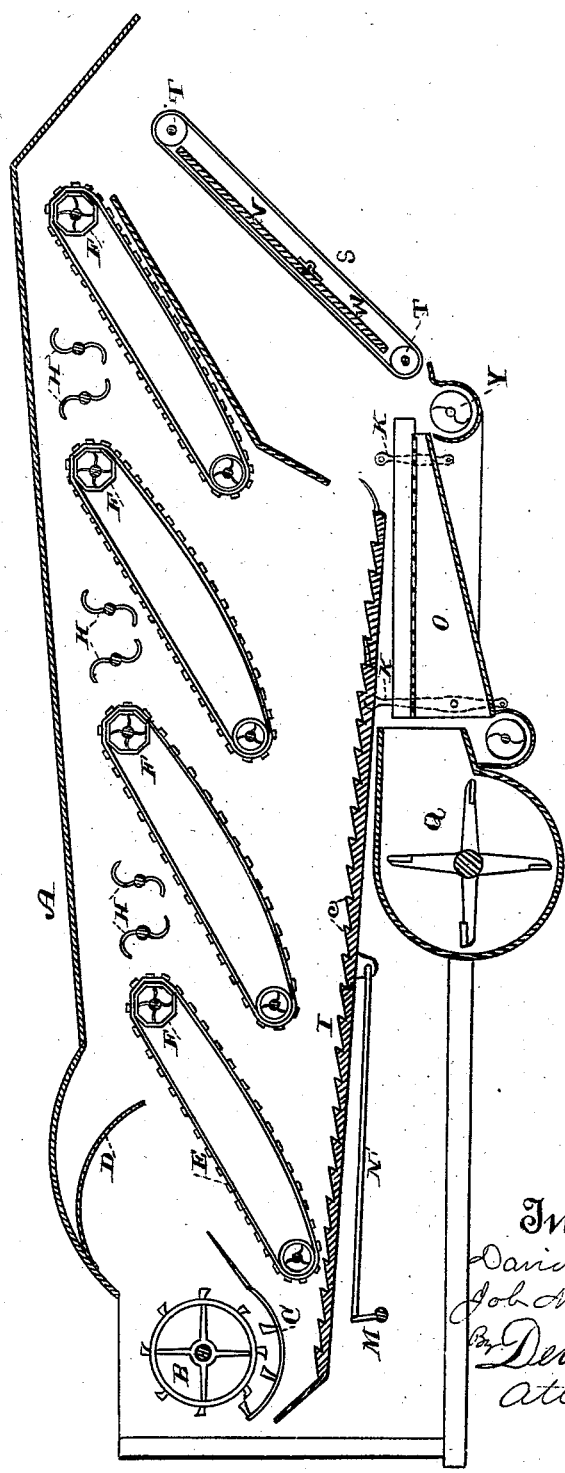

(No Model.) 3 Sheets—Sheet 3.
D. H. RADER & J. MALSBARY.
GRAIN THRASHER AND CLEANER.
No. 273,391. Patented Mar. 6, 1883.
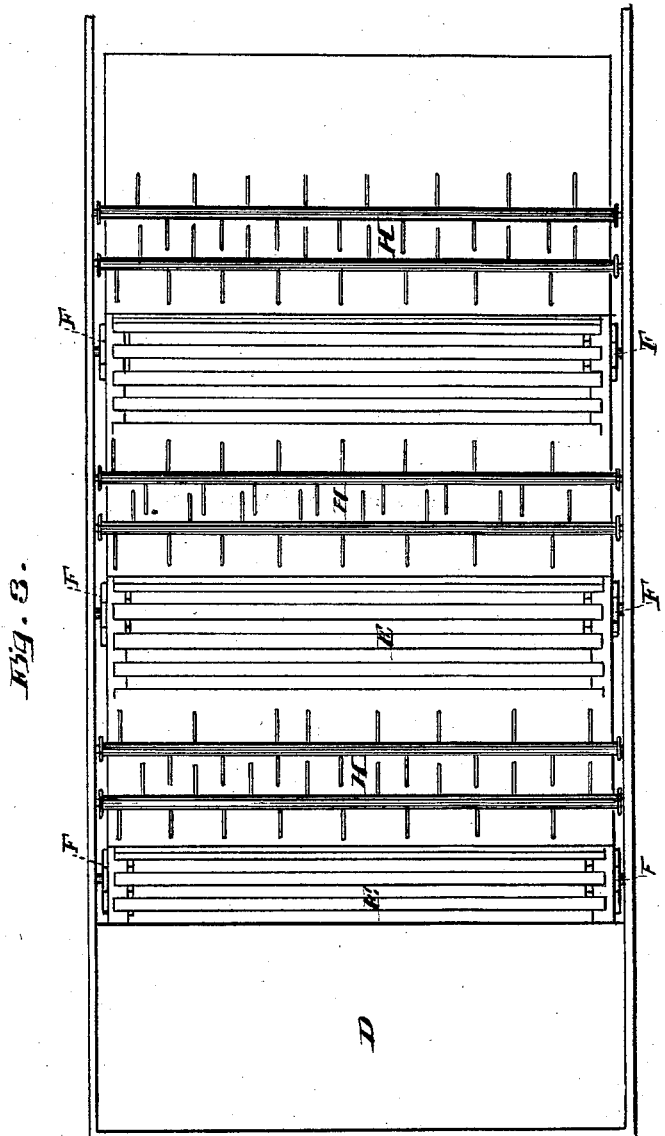
Witnesses,
Geo. H. Strong.
L. H. House.
Inventor.
David H. Rader
Job. Malsbary
By Dewey & Co.
Attorneys

UNITED STATES PATENT OFFICE.

DAVID H. RADER, OF GILROY, AND JOB MALSBARY, OF HOLLISTER, CAL.

GRAIN THRASHER AND CLEANER.

SPECIFICATION forming part of Letters Patent No. 273,391, dated March 6, 1883.

Application filed October 21, 1882. (No model.)

*To all whom it may concern:*

Be it known that we, DAVID H. RADER, of Gilroy, county of Santa Clara, and JOB MALSBARY, of Hollister, county of San Benito, all in the State of California, have invented an Improved Grain Thrasher and Cleaner; and we hereby declare the following to be a full, clear, and exact description thereof.

Our invention relates to certain improvements in machinery for cleaning and thrashing grain. Its object is to greatly increase the cleaning capacity in proportion to the thrashing capacity; and to this end the invention consists in novel features of construction and combination and arrangement of parts, all as will be hereinafter fully described, and set forth in the claims hereto annexed.

Referring to the accompanying drawings for a more complete explanation of our invention, Figure 1 is a perspective view. Fig. 2 is a longitudinal vertical section. Fig. 3 is a top view of a machine embodying our improvements.

In the ordinary construction of thrashing-machines the width of the frame varies but little throughout its length, and a cylinder of given size will always thrash more grain than any cleaning and separating device which can be introduced into the same width can dispose of.

In most machines the grain and straw are carried together upon belts to the point where the grain is discharged upon the cleaning-shoe, the only separation which takes place up to this point being to settle the grain upon the belt below the straw, and this is never so completely done but that much grain is lost and carried off with the straw.

In our apparatus, B is the thrashing-cylinder; C, the concave between which and the cylinder the thrashed straw passes, being delivered to it by any suitable or well-known form of feeder. From the cylinder the straw is thrown forcibly upward into a concave or arch, D, which is placed just above and back of the cylinder. This arch has a length equal to the breadth of the body A of the machine, which is much greater than the length of the cylinder, the proportion being for a forty-inch cylinder sixty inches or upward. The peculiar effect of the arch D upon the straw which is thrown into it from the cylinder is to give it a whirling motion as it passes around, and at the same time spread it out to the full width, throwing it down upon the first section of the straw-carrier E evenly from one side to the other, most of the grain passing through at once to the grain-table below.

The straw-carrier consists of three, four, or more sections of slats extending across the inside of the body, and secured at each end to belts, which pass around pulleys F, having an irregular face of any number of sides, and by which they are supported, driven, and shaken. The sections are so placed that the first extends on an incline upward and backward from the cylinder and overhangs the lower end of the next section, which in turn extends upward in the same manner and overhangs the next section, and so on to rear or discharge end of the machine. The slats may be placed from an inch to an inch and a half apart, so as to allow any grain which may be carried up with the straw to fall through freely. At the end of each section except the last one are placed revolving pickers H, over which the straw passes, and as it does so the pickers tear it in pieces and separate it to allow any grain which may have been commingled with it and carried up to fall out.

In the present case we have shown the table suspended upon links or hangers, so that it may be caused to reciprocate by the action of a crank, M, and connecting-rod N. The upper surface of the table has transverse slats $c$ fixed to it, the backs of which are inclined, while their front edges are vertical, and as the table is depressed toward the rear end of the machine the reciprocating movement, aided by the cross-bars, carries the grain and chaff back to the shoe.

The cleaning-shoe O is suspended from the lower ends of the links or hangers K, which also support the table from their upper ends, and as the fulcrum-pin passes through the hangers midway between the two points, the table and the shoe are reciprocated simultaneously.

The rear end of the machine is nearly closed by an inclined end, V, the lower part, W, of which is hinged, so that it may swing downward and outward and have the whole interior open for inspection or repairs, if necessary. In order to carry off the chaff which is blown out by the fan Q, a slat belt, S, passes over pulleys T at the top and bottom of this inclined end, and is so driven that it drags up over the inside, and thus lifts the chaff to a point where it escapes, with the straw, through the rear of the machine.

By this construction the chaff is discharged at the top of the machine with the straw, and does not incommode the man who removes the accumulated straw and chaff. It is carried farther from the machine.

The door allows easy access without any disturbance of the parts.

From the position and inclination of the grain-table, the cleaning-shoe must be placed very low, and when the grain is carried out at the side by means of the auger or screw it is too low for sacking. We have therefore constructed a screw-elevator, $z$, partially shown in Fig. 1, which is fixed vertically at the side, so as to receive the grain as it is discharged by the horizontal auger Y and elevate it to the sacking apparatus, whence it is discharged into the sacks, as shown, or in other suitable manner. The vertical screw is driven by a bevel-gearing, $x$, from a shaft extending across the machine, and its use enables us to lower the grain-table and cleaning-shoe without making the sacking inconvenient and without employing any elevating-belt or other device within the machine. By this construction we dispense with all close belts. The principal part of the grain is separated from the straw at or near the cylinder, leaving but a small portion mingled with the straw, and this is easily separated while the straw is passing nearly the whole length of the machine and over three or more carriers, with their intervening pickers. The grain is also carried from the cylinder to the cleaning-shoe the whole length of the machine in a separate body from the straw, and by increasing the width of the machine immediately beyond the cylinder and employing the distributing-arch the cleaning and separating are very perfectly accomplished.

By the use of the vertical elevating-screw to carry the grain to the sacker the cylinder is kept low, and the grain-carrier passes beneath it and forms an incline to the shoe, which is placed beneath its rear end, so that no elevators are necessary until the grain is entirely cleaned. The mechanism is thus reduced to the fewest parts, and is of the simplest description, and is very easily driven.

We are aware that a series of close carrying-belts have been used to deflect the grain down upon a carrying-belt without spreading it, and also that pickers have been used in various positions with relation to the belts, and we do not claim any of these, broadly; but,

Having thus described our invention, what we claim as new, and desire to secure by Letters Patent, is—

1. In a grain-thrashing apparatus, and in combination with the cylinder B, the spreader D, and the cleaning-shoe, the open straw-carrying sections E, revolving with relation to each other and intervening pickers, H, as shown, and the single continuous independent grain-table I, extending from a point beneath the cylinder and inclining downward to the cleaning-shoe at the rear, substantially as shown and herein described.

2. In a grain thrashing and cleaning apparatus, and in combination with the cylinder B, the straw-carrying sections E, intervening pickers, and the grain-shoe, as shown, the independent grain-carrying table I, inclining downward from a point beneath the cylinder to the cleaning-shoe O, centrally-pivoted links K, and the crank M and pitman N, substantially as herein described.

3. In a grain thrashing and cleaning apparatus, and in combination with the cylinder B, straw-carrying sections E, inclined grain-carrying table I, and cleaning-shoe O, as shown, the incline V, partially closing the rear end, and the revolving chaff-carrier S, moving over it, substantially as and for the purpose herein shown and described.

In witness whereof we hereunto set our hands.

DAVID H. RADER.
JOB MALSBARY.

Witnesses:
GEO. E. HERSEY,
E. R. SMITH.